United States Patent
Peterson et al.

(10) Patent No.: US 6,564,171 B1
(45) Date of Patent: May 13, 2003

(54) METHOD AND APPARATUS FOR PARSING EVENT LOGS TO DETERMINE TOOL OPERABILITY

(75) Inventors: Anastasia Oshelski Peterson, Austin, TX (US); Richard Edwards, Austin, TX (US)

(73) Assignee: Advanced Micro Devices Inc., Austin, TX (US)

( * ) Notice: Subject to any disclaimer, the term of this patent is extended or adjusted under 35 U.S.C. 154(b) by 134 days.

(21) Appl. No.: 09/661,694

(22) Filed: Sep. 14, 2000

(51) Int. Cl.⁷ .......................... G06F 17/60; G06F 17/30
(52) U.S. Cl. ........................ 702/182; 235/379; 370/463; 375/13; 705/1; 702/182; 707/103 R; 709/228
(58) Field of Search ......................... 702/84, 177, 182, 702/185, 186, 119; 700/65, 110, 247; 395/75, 76, 680, 682; 370/463; 375/13; 705/1; 707/103 R

(56) References Cited

U.S. PATENT DOCUMENTS

| | | | | |
|---|---|---|---|---|
| 5,412,758 A | * | 5/1995 | Srikanth et al. ............... | 706/59 |
| 5,452,218 A | * | 9/1995 | Tucker et al. ................ | 700/110 |
| 5,455,894 A | * | 10/1995 | Conboy et al. ............. | 700/247 |
| 5,465,221 A | * | 11/1995 | Merat et al. ................... | 702/83 |
| 5,488,648 A | * | 1/1996 | Womble ....................... | 375/13 |
| 5,701,488 A | * | 12/1997 | Mulchandani et al. ...... | 717/128 |
| 5,757,673 A | * | 5/1998 | Osheiski et al. ............. | 702/182 |
| 5,790,431 A | * | 8/1998 | Ahrens et al. ............... | 709/104 |
| 5,981,478 A | * | 11/1999 | Gill et al. .................... | 235/379 |
| 5,999,908 A | * | 12/1999 | Abelow ......................... | 705/1 |
| 6,144,967 A | * | 11/2000 | Nock ...................... | 707/103 R |
| 6,317,793 B1 | * | 11/2001 | Toyosawa .................... | 709/228 |
| 6,370,154 B1 | * | 4/2002 | Wickham .................... | 370/463 |

\* cited by examiner

Primary Examiner—John Barlow
Assistant Examiner—John Le
(74) Attorney, Agent, or Firm—Williams, Morgan & Amerson PC

(57) ABSTRACT

A method for determining operability of a tool includes generating an event log including a plurality of events associated with the operation of the tool; parsing the event log to identify a crucial event; and initiating an automatic corrective action in response to identifying a crucial event. A manufacturing system includes a tool and a tool monitor. The tool is adapted to generate an event log including a plurality of events associated with the operation of the tool. The tool monitor is adapted to parse the event log to identify a crucial event and initiate an automatic corrective action in response to identifying a crucial event.

33 Claims, 2 Drawing Sheets

METHOD AND APPARATUS FOR PARSING EVENT LOGS TO DETERMINE TOOL OPERABILITY

BACKGROUND OF THE INVENTION

1. Field of the Invention

The invention relates generally to analysis and control of equipment used in fabrication facilities and, more particularly, to a method and apparatus for parsing event logs to determine tool operability.

2. Description of the Related Art

Manufacturing facilities, such as semiconductor device manufacturing facilities, commonly employ a series of automated tools. The tools operate in accordance with predetermined scripts, or recipes. Some tools include internal monitoring systems that report various events, including errors, to a tool operator. Typically, these reported events are displayed on a printer or a display screen and/or written to a data file.

One technique for collecting and displaying the conditions of a photolithography stepper tool is described in U.S. Pat. No. 5,757,673, entitled, "AUTOMATED DATA MANAGEMENT SYSTEM FOR ANALYSIS AND CONTROL OF PHOTOLITHOGRAPHY STEPPER PERFORMANCE" and incorporated herein by reference in its entirety. An exemplary tool capable of reporting various test and error data is a photolithography stepper, such as those available from ASM Lithography, Inc., located in Eindhoven, Netherlands. In this regard, at least one program, in particular, a Virtual Paperless Equipment Logging System hereinafter referred to as "VPELS," has been developed to collect the raw stepper data, save the data to an ASCII file, and periodically upload the ASCII files to a network drive, at which point it may be downloaded and/or printed.

One limitation of such logging systems is their reliance on the operator to identify and respond to error conditions. There is a high volume of log data being generated and displayed (e.g., on a printout or a display) or captured to a data file. Due to the large amount of data continuously being output, it is not uncommon for an operator to miss an error condition that could result in a significant degradation of the operation of the tool. Such degradation, although eventually identifiable through measurements of the downstream processed wafers, may not be identified for a number of runs. Wafers processed in the interim may require rework or they may be scrapped, depending on the nature of the defects.

Compounding the error condition identification problem is the fact that a large amount of the data being logged is routine information regarding tool operation rather than error information. Error conditions can be buried among other routine traffic, making them harder to identify.

The present invention is directed to overcoming, or at least reducing the effects of, one or more of the problems set forth above.

SUMMARY OF THE INVENTION

One aspect of the present invention is seen in a method for determining operability of a tool. The method includes generating an event log including a plurality of events associated with the operation of the tool; parsing the event log to identify a crucial event; and initiating an automatic corrective action in response to identifying a crucial event.

Another aspect of the present invention is seen in a manufacturing system including a tool and a tool monitor. The tool is adapted to generate an event log including a plurality of events associated with the operation of the tool. The tool monitor is adapted to parse the event log to identify a crucial event and initiate an automatic corrective action in response to identifying a crucial event.

BRIEF DESCRIPTION OF THE DRAWINGS

The invention may be understood by reference to the following description taken in conjunction with the accompanying drawings, in which like reference numerals identify like elements, and in which.

Figure 1:
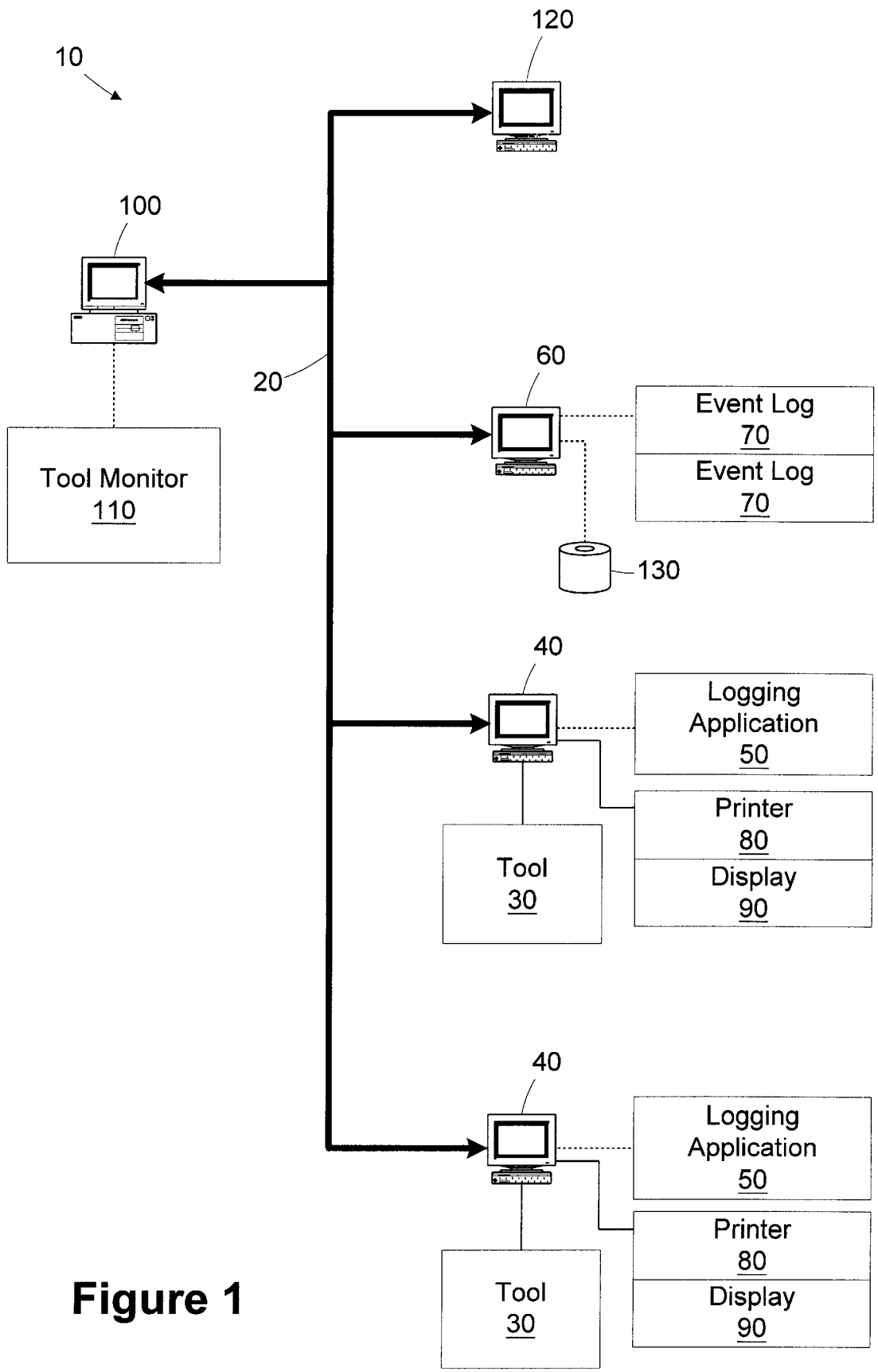
FIG. 1 is a simplified block diagram of a manufacturing system in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring to FIG. 1, a simplified block diagram of a manufacturing system 10 is provided. A network 20 interconnects various components of the manufacturing system, allowing them to exchange information. The manufacturing system 10 includes a plurality of tools 30, each being coupled to a computer 40 for interfacing with the network 20. Logging applications 50 hosted by the respective computers 40 log event data generated by the tools 30 and transfer the event data to a file server 60, where it is accumulated and stored as event logs 70. The distribution of the processing and data storage functions amongst different computers 40, 60 is generally conducted to provide independence and a central information store. Of course, more or less computers may be used.

A printer 80 and/or a display unit 90 may be coupled to the computers 40 to display the output of the associated logging application 50 as it is being collected from the tool 30. An operator may view the event data as it is being logged. A system host computer 100 executes a tool monitor program 110 adapted to evaluate the event logs to determine error conditions and take appropriate corrective actions. A process control server 120 directs the high level operation of the manufacturing system 10 by directing the process flow of the manufacturing system 10. The process control server 120 monitors the status of the various entities in the manufacturing system, including the tools 30.

Portions of the invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

For illustrative purposes, the present invention is described as it may be implemented on a photolithography stepper tool, such as an ASML stepper available from ASM Lithography, Inc., Eindhoven, Netherlands. However, the scope of the instant invention is not so limited. The techniques described herein may be applied to any tool that generates an event log.

In general, the tool monitor 110 extracts data from the event logs 70 using known file manipulation and string parsing functions provided by commercial software tools or custom application programs (e.g., programmed in C or Tcl) and stores the processed data in a database 130 on the file server 60. There are various ways the data from the event logs 70 may be handled. For example, the data stream may be captured directly from the port of the tool 30 and written to another file that is parsed by the tool monitor 110. The parsed data may then be uploaded to the database 130. Alternatively, the tool monitor 110 may capture the data stream for direct upload to the database 130. In still another variation, the tool monitor 110 may directly parse the event log 70 generated by the tool 30. Typically, the files are written in an ASCII format, although other formats may be used. If the ASCII file(s) to be processed does not have a structured format, the utility searches for key words and parses the appropriate data using pieces of the file stream. If the file has a structured format, with each field delimited by a comma or blank, then direct file-to-database transfer is possible.

The tool monitor 110 parses the event logs 70 at a predetermined frequency to determine the presence of error conditions adverse to proper processing in the tool. Alternatively, the tool monitor 110 may capture the log data as it is being generated and essentially perform its parsing functions in real time. Exemplary frequencies include once per lot, once every 3 lots, etc. Alternatively, the tool monitor 110 may receive the log data as it is being generated and essentially perform its parsing functions in real time for each individual event.

The tool monitor 110 may display the results of the parsing in any number of formats. For example, the tool monitor 110 may display a chart listing the most frequent events or a chart listing only those events designated as error events for a given tool 30 or subset of tools 30. The parsing function performed by the tool monitor 110 may also include a filtering component to mask or group the events. Events that occur frequently, but are routine in nature, may be masked. As such the displayed results would be focused more on the events designated as important. For example, the events may be limited by date ranges, a particular type of tool 30, a particular device/product/layer/route, an individual tool 30, or a subset of the tools 30. An illustrative, but not exhaustive, list of possible display formats includes; the top 10 errors across all tools 30 or a subset of the tools 30; a single error analysis comparison with all or a subset of the tools 30; the duration or mean time between a particular error or event begin and end; a modeling of events or errors to determine tool shutdown conditions; and a correlation of event/error data with process data to determine a corrective action for the tool 30 and/or product health.

The particular event classifications are application specific. Each particular tool (e.g., 30) may have a different event classification structure. In response to certain crucial events, it may be desirable to take the tool 30 out of service immediately. Such crucial events may cause the tool to function out of specification with the process targets. As a result, items (e.g., wafers) processed in the tool 30 may be defective. An exemplary discussion of crucial events as applied to a photolithography stepper tool is provided below, however, a different tool may have different crucial event definitions. Additionally, in an actual implementation, additional crucial events may be designated.

An error condition may be flagged based on a single occurrence of a crucial event, or alternatively, an error condition may be flagged based a sequence of events. That sequence may be a simple aggregation of a certain number of like events in a predetermined time period or a pareto chart analysis. A more complex model that considers interactions between events of differing types may also be used. Numerous modeling systems are well known in the art, including neural network modeling, principal component analysis (PCA), and projection to latent structures (PLS). These modeling techniques may be used to predict a failure condition based on the synergistic effects of a sequence of prior events. Exposing the model to history data collected on the tool 30 allows it to learn the interactions between various events and predict future occurrences. Techniques for implementing these modeling methods are well known to those of ordinary skill in the art, and for clarity, they are not described in greater detail herein.

Within the context of a photolithography stepper tool, exemplary crucial events include a laser blower failure, a focus error, or an inability to align the reticle. Photolithography processes are highly temperature sensitive. As a result steppers are typically equipped with their own temperature control systems. If the temperature control system fails, the temperature of the stepper gradually increases. An increased temperature reduces the ability of the stepper to focus, eventually resulting in the critical dimensions of the pattern being formed to stray outside of specifications. Any wafer processed after the stepper is unable to properly focus would need to be scrapped or reworked.

In response to identifying a crucial event, the tool monitor 110 may automatically take a variety of corrective actions. These corrective actions may include sending a message to the process control server 120 to log the tool 30 out of service and sending an alert to an operator of the tool 30. The message to the operator may include information regarding a needed corrective action, a preventative maintenance procedure, etc. The operator may then interface with the tool monitor 110 to review the latest event data parsed from the event log 70.

Figure 2:
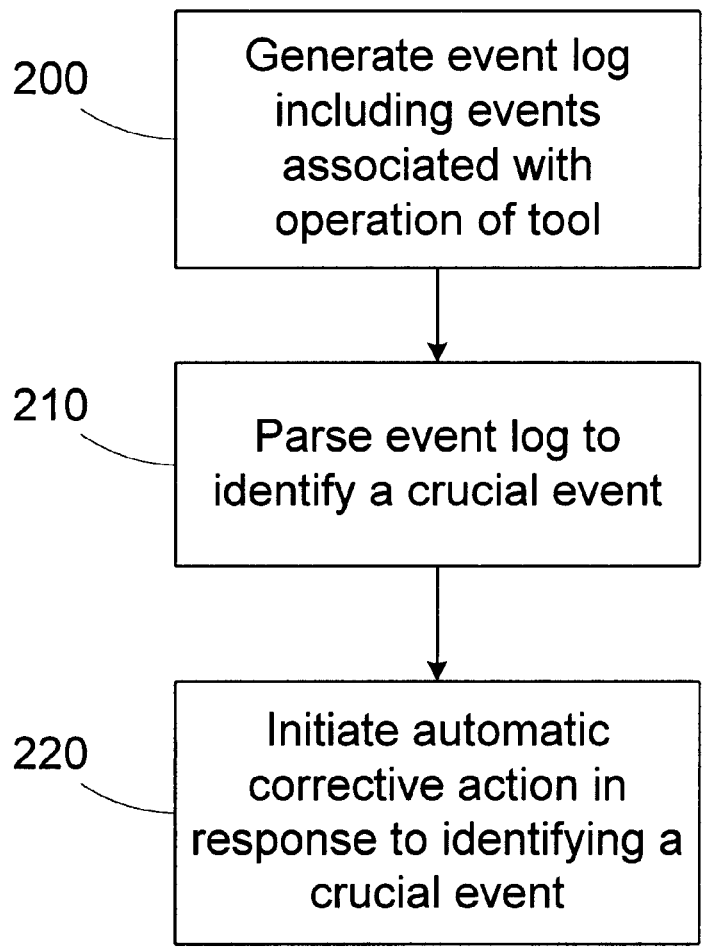
FIG. 2 is a flow diagram of a method for determining the operability of a tool in accordance with the present invention.

Turning now to FIG. 2, a flow diagram of a method for determining tool operability in accordance with the present invention is provided. In block 200, an event log is generated. The event log includes a plurality of events associated with the operation of the tool. In block 210, the event log is parsed to identify a crucial event. Parsing the event log may include masking certain events. In block 220, an automatic corrective action is initiated in response to identifying a crucial event. The automatic corrective action may include an alert message to an operator or a message to the process control server 120 to log the tool out of service. The alert message may include a recommended curative action, such as a suggested maintenance procedure.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for determining operability of a tool, comprising:
   defining a plurality of crucial events;
   generating an event log including a plurality of events associated with the operation of the tool;
   autonomously parsing the event log to identify one of the plurality of crucial events; and
   initiating an automatic corrective action in response identifying the crucial event.

2. The method of claim 1, further comprising displaying the most frequently occurring events.

3. The method of claim 1, further comprising masking at least one of the events.

4. The method of claim 1, wherein parsing the event log includes identifying a single occurrence of the crucial event.

5. The method of claim 1, wherein parsing the event log includes identifying a predetermined number of occurrences of the crucial event within a predetermined time interval.

6. The method of claim 1, wherein parsing the event log includes identifying a pattern of occurrences of related events.

7. The method of claim 1, wherein parsing the event log in the method includes analyzing a pareto chart of the events.

8. The method of claim 1, wherein initiating the automatic corrective action includes sending an alert to a tool operator.

9. The method of claim 1, wherein initiating the automatic corrective action includes logging the tool out of service in response to identifying the crucial event.

10. The method of claim 9, wherein logging the tool out of service includes sending a message to a process control server.

11. A manufacturing system, comprising:
    a tool adapted to generate an event log including a plurality of events associated with the operation of the tool; and
    a tool monitor adapted to autonomously parse the event log to identify a crucial event from a plurality of defined crucial events and initiate an automatic corrective action in response to identifying the crucial event.

12. The manufacturing system of claim 11, wherein the tool monitor comprises a computer having a display and executing an application adapted to display the most frequently occurring events on the display.

13. The manufacturing system of claim 11, wherein the tool monitor is adapted to mask at least one of the events.

14. The manufacturing system of claim 11, wherein the tool monitor is adapted to identify a single occurrence of the crucial event.

15. The manufacturing system of claim 11, wherein the tool monitor is adapted to identify a predetermined number of occurrences of the crucial event within a predetermined time interval.

16. The manufacturing system of claim 11, wherein the tool monitor is adapted to identify a pattern of occurrences of related events.

17. The manufacturing system of claim 11, wherein the tool monitor is adapted to analyze a pareto chart of the events.

18. The manufacturing system of claim 11, wherein the automatic corrective action comprises an alert message to a tool operator.

19. The manufacturing system of claim 11, further comprising a process control server adapted to control operation of the manufacturing system, wherein the automatic corrective action comprises a message to the process control server to log the tool out of service.

20. A program storage device encoded with instructions, that when executed by a computer, perform a method for determining operability of a tool, the method comprising:
    accessing an event log, the event log including a plurality of events associated with the operation of the tool;
    autonomously parsing the event log to identify a crucial event from a plurality of defined crucial events; and
    initiating an automatic corrective action in response to identifying the crucial event.

21. The program storage device of claim 20, wherein the method further comprises displaying the most frequently occurring events.

22. The program storage device of claim 20, wherein the method further comprises masking at least one of the events.

23. The program storage device of claim 20, wherein parsing the event log in the method includes identifying a single occurrence of the crucial event.

24. The program storage device of claim 20, wherein parsing the event log in the method includes identifying a predetermined number of occurrences of the crucial event within a predetermined time interval.

25. The program storage device of claim 20, wherein parsing the event log in the method includes identifying a pattern of occurrences of related events.

26. The program storage device of claim 20, wherein parsing the event log in the method includes analyzing a pareto chart of the events.

27. The program storage device of claim 20, wherein initiating the automatic corrective action in the method includes sending an alert to a tool operator.

28. The program storage device of claim 20, wherein initiating the automatic corrective action in the method includes logging the tool out of service in response to identifying the crucial event.

29. The program storage device of claim 28, wherein logging the tool out of service in the method includes sending a message to a process control server.

30. A manufacturing system, comprising:

a tool;

means for defining a plurality of crucial events;

means for accessing an event log, the event log including a plurality of events associated with the operation of the tool;

means for parsing the event log to identify a crucial event; and means for initiating an automatic corrective action in response to identifying the crucial event.

31. A method for determining operability of a tool, comprising:

defining a plurality of crucial events;

generating an event log including a plurality of events associated with the operation of the tool;

autonomously parsing the event log to identify one of the plurality of crucial events; and automatically inhibiting subsequent operation of the tool in response to identifying the crucial event.

32. A manufacturing system, comprising:

a tool adapted to generate an event log including a plurality of events associated with the operation of the tool; and a tool monitor adapted to autonomously parse the event log to identify a crucial event from a plurality of defined crucial events and automatically inhibit subsequent operation of the tool in response to identifying the crucial event.

33. A program storage device encoded with instructions, that when executed by a computer, perform a method for determining operability of a tool, the method comprising:

accessing an event log, the event log including a plurality of events associated with the operation of the tool;

autonomously parsing the event log to identify a crucial event from a plurality of defined crucial events; and automatically inhibiting subsequent operation of the tool in response to identifying the crucial event.

* * * * *